United States Patent [19]

Newlin et al.

[11] 4,426,400

[45] Jan. 17, 1984

[54] DEVILED EGG PROCESS

[75] Inventors: James L. Newlin, Rochester; William J. Stadelman, West Lafayette, both of Ind.

[73] Assignees: Tip-E-Pak, Inc., Rochester; Purdue Research Foundation, West Lafayette, both of Ind.

[21] Appl. No.: 512,597

[22] Filed: Jul. 11, 1983

Related U.S. Application Data

[63] Continuation of Ser. No. 326,013, Nov. 30, 1981, abandoned.

[51] Int. Cl.³ .............................................. A23L 1/32
[52] U.S. Cl. .................................. 426/282; 426/614; 426/514
[58] Field of Search ............... 426/614, 280, 282, 104, 426/113, 120, 514

[56] References Cited

U.S. PATENT DOCUMENTS

| 1,842,733 | 1/1932 | Reynolds et al. | 426/614 |
| 1,989,359 | 1/1935 | Heuser | 426/614 X |
| 2,421,199 | 5/1947 | Gutmann | 426/614 X |
| 2,660,530 | 11/1953 | Adams | 426/299 |
| 3,113,872 | 12/1963 | Jones et al. | 426/511 X |
| 3,207,609 | 9/1965 | Gorman et al. | 426/614 |
| 3,285,749 | 11/1966 | Shires | 426/614 X |
| 3,385,712 | 5/1968 | Dodge et al. | 426/614 X |
| 3,404,008 | 10/1968 | Ballas et al. | 426/614 X |
| 3,493,393 | 2/1970 | Shires | 426/614 X |
| 3,510,315 | 5/1970 | Hawley | 426/614 X |
| 3,624,230 | 11/1971 | Robinson, Jr. | 426/614 |
| 3,831,508 | 8/1974 | Wallard | 426/113 X |
| 3,851,571 | 12/1974 | Nichols | 426/113 X |
| 3,857,980 | 12/1974 | Johnson | 426/614 X |
| 3,863,018 | 1/1975 | Shires | 426/388 |
| 4,161,548 | 7/1979 | Warren | 426/614 X |

Primary Examiner—Robert A. Yoncoskie
Attorney, Agent, or Firm—Barnes & Thornburg

[57] ABSTRACT

Deviled eggs are prepared by an improved method, starting with a blended mixture of liquid egg whites. The mixture is evacuated to remove air and other gases, then dispensed into a multiplicity of open molds carried on conveyor means, said molds shaped like half an egg and of similar size. A second mold is positioned centrally in the first mold to make a cavity in the egg white similar in shape and size to half an egg yolk. The egg white is cooked in steam at atmospheric pressure, then cooled, and removed from the mold. Into the resulting cooked egg whites is dispensed a mixture of cooked egg yolk and seasonings, yielding the desired deviled egg product.

7 Claims, 4 Drawing Figures

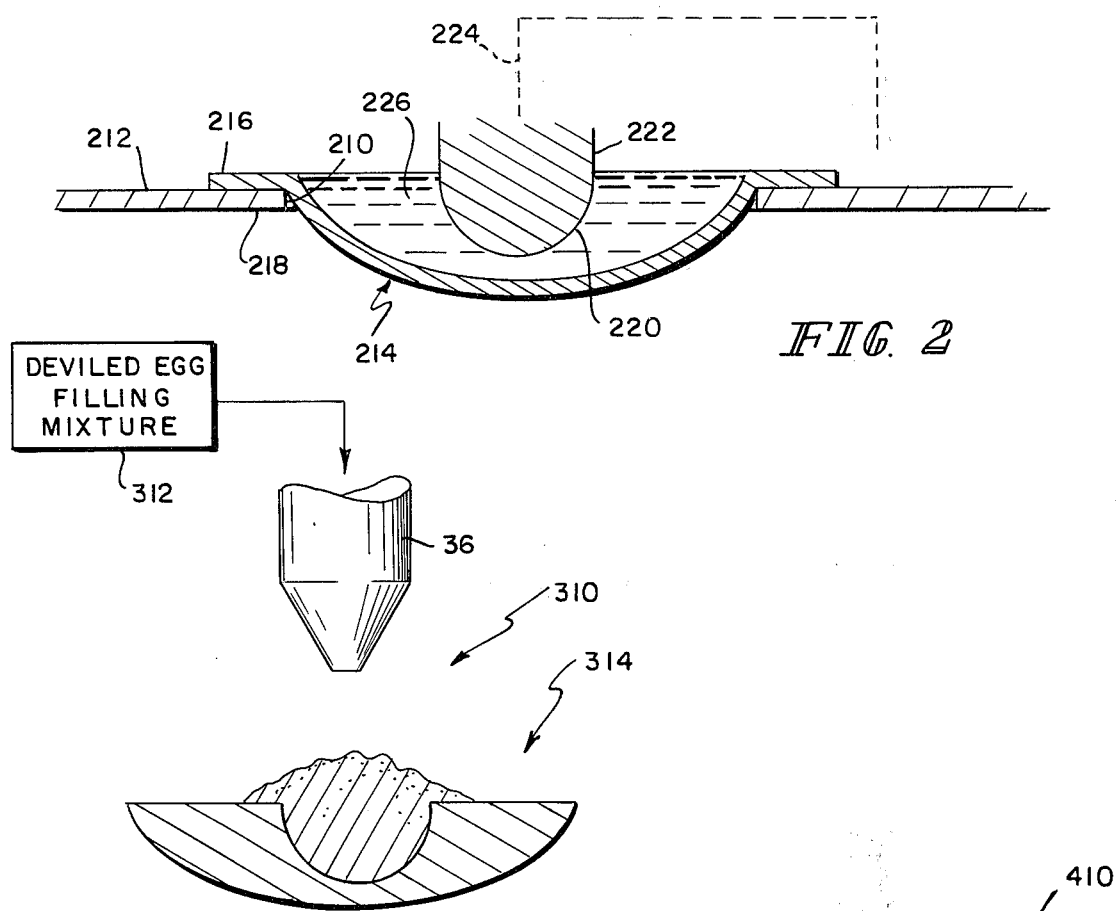
FIG. 2
FIG. 3
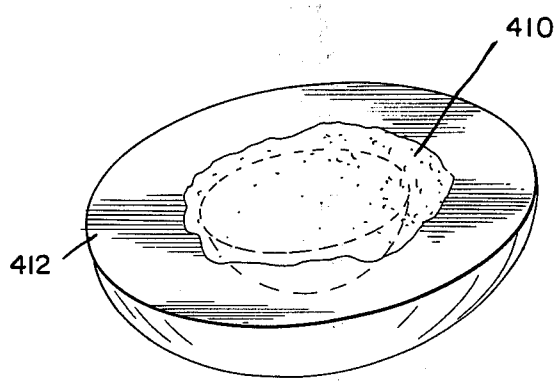
FIG. 4

DEVILED EGG PROCESS

This is a continuation of application Ser. No. 06/326,013 filed Nov. 30, 1981, now abandoned.

The present invention relates to the production of deviled eggs, and more particularly to the production of cooked egg white halves from blended egg whites.

The conventional method for making deviled eggs is labor-intensive, involving boiling the eggs in the shell, removing the shell, splitting the eggs in half, separating the yolks from the whites, blending the yolks with seasonings, and dispensing the seasoned yolks back into the yolk cavity of the whites. Because of the inordinate amount of labor required, deviled eggs tend to be relatively expensive and indeed are beyond the reach of certain food purveyors, e.g., school cafeterias, where they might otherwise be consumed in large quantities.

It is accordingly of interest to minimize the labor cost involved in producing deviled eggs. This is achieved in the present invention by separate bulk-processing of egg whites and egg yolks according to techniques described hereinafter.

One object of this invention is to prepare deviled eggs in a simpler and more economical manner than available heretofore.

Another object is to reduce the labor cost component in the preparation of deviled eggs.

A further object is to prepare directly from blended liquid egg whites a product having the form and other characteristics of hard-cooked egg white halves.

A further object is to prepare hard-cooked egg white halves that can be frozen and thawed without loss in quality.

Other objects of the invention and its advantages over the prior art will be apparent from the following description.

In one embodiment of the invention, deviled eggs are prepared according to the following procedure: Raw eggs are broken and the yolks and whites are separated and separately pooled. The egg whites are blended under vacuum until homogeneous and until dissolved and entrained air and other gases have been removed therefrom. The de-aerated egg whites are dispensed into molds of the shape and size of half an egg, with a centrally disposed, removable insert which forms a hemispherical cavity the size of half a yolk in the egg white pool in each mold. The egg whites are cooked, e.g., with steam. The central insert is then removed, and the cooked egg white halves are unloaded, or alternatively, they are filled in situ.

The filling for the egg white halves is prepared by cooking the pooled egg yolks until solid and dry, and blending the cooked yolks with appropriate seasonings. The yolk mix is dispensed into the cooked egg white halves to form the completed deviled eggs.

The product thus obtained can be stored for a limited time under refrigeration. For longer-term storage and shipping, it can be subjected to quick freezing in a known manner—for example, in spaced trays in a freezer with forced-draft circulation of chilled air. Quick freezing is preferred in order to minimize any tendency of the product to exude water on thawing and to prevent an unsatisfactory appearance. Further protection for the frozen product can be achieved if desired by incorporating a water-binding material into the pooled egg whites before they are vacuum-treated and cooked, as described in Hawley U.S. Pat. No. 3,510,315.

The water-binding materials include a variety of starches, edible gums, and food-grade water-soluble cellulose derivatives which are capable, by virtue of their polymeric structure and hydrophilic nature, of absorbing and retaining the water in the liquid egg whites through the cycle of cooking, freezing, and thawing. Particularly useful are carbohydrates such as corn, tapioca, rice, and potato starches; edible gums such as gum arabic, gum acacia, gum tragacanth, karaza gum, ghatti gum, locust bean gum, guar gum, and carrageenan, as well as agar and algin; and water-soluble, food-grade cellulose derivatives such as methylcellulose, methylethylcellulose, hydroxyethylcellulose, hydroxypropylcellulose, methylhydroxyethylcellulose, ethylhydroxyethylcellulose, methylhydroxypropyl cellulose, sodium carboxymethylcellulose, and sodium carboxymethylhydroxyethylcellulose; and the like. The water-binding materials can be added to the liquid egg white in an amount up to about 10% by weight based on the weight of the liquid egg white, preferably between about 2% and about 4% by weight for starches and between about 0.25% and about 1% by weight for gums and cellulose derivatives.

The use of vacuum treatment in processing blended egg materials has been carried out heretofore for a variety of reasons. Reynolds U.S. Pat. No. 1,842,733, in mixing egg white and/or yolk with a solid such as salt or sugar, carries out the operation in vacuo to avoid incorporation of oxygen into the mixture (which would cause deterioration of the product) and to avoid formation of an objectionable layer of foam at the top of the mixture. Heuser U.S. Pat. No. 1,989,359 mixes whole egg with sugar and a salt, then applies high vacuum to remove air, thereby obtaining a clear liquid for further processing. Jones U.S. Pat. No. 3,113,872 homogenizes egg, pasteurizes, then heats briefly under vacuum to remove objectionable odors and flavors. Ballas U.S. Pat. No. 3,404,008 also pasteurizes egg whites or other egg materials, but applies vacuum to remove entrapped air before heating to pasteurizing temperature, thereby avoiding localized overheating and coagulation. In the present invention, the removal of air helps in preventing the formation of air bubbles, air holes, and a spongy texture in the cooked egg white, and thereby substantially improves the quality of the product.

The degree of vacuum employed is not critical, since the goal is only to avoid any separation of gas bubbles in subsequent processing. Ordinarily, an absolute pressure of 50 to 100 Hg in the treating vessel is sufficient, with gentle stirring over a period of 5 to 10 minutes, to adequately remove the dissolved and entrained gases. The higher the vacuum, of course, and the longer the treatment time, the more fully will the gases be removed, but total removal is unnecessary. The vacuum treatment can be carried out either during the blending operation or as a subsequent step as desired.

The present invention is described in the attached drawings, as follows:

FIG. 2 is a simple apparatus for cooking egg whites to form cooked egg white halves having centrally located cavities of the size and shape of half a yolk;

FIG. 3 illustrates a filler station for dispensing a mixture of cooked yolk and seasonings into the cooked egg white halves; and FIG. 4 is a cross-sectional view of the deviled egg product of the invention.

Figure 1:
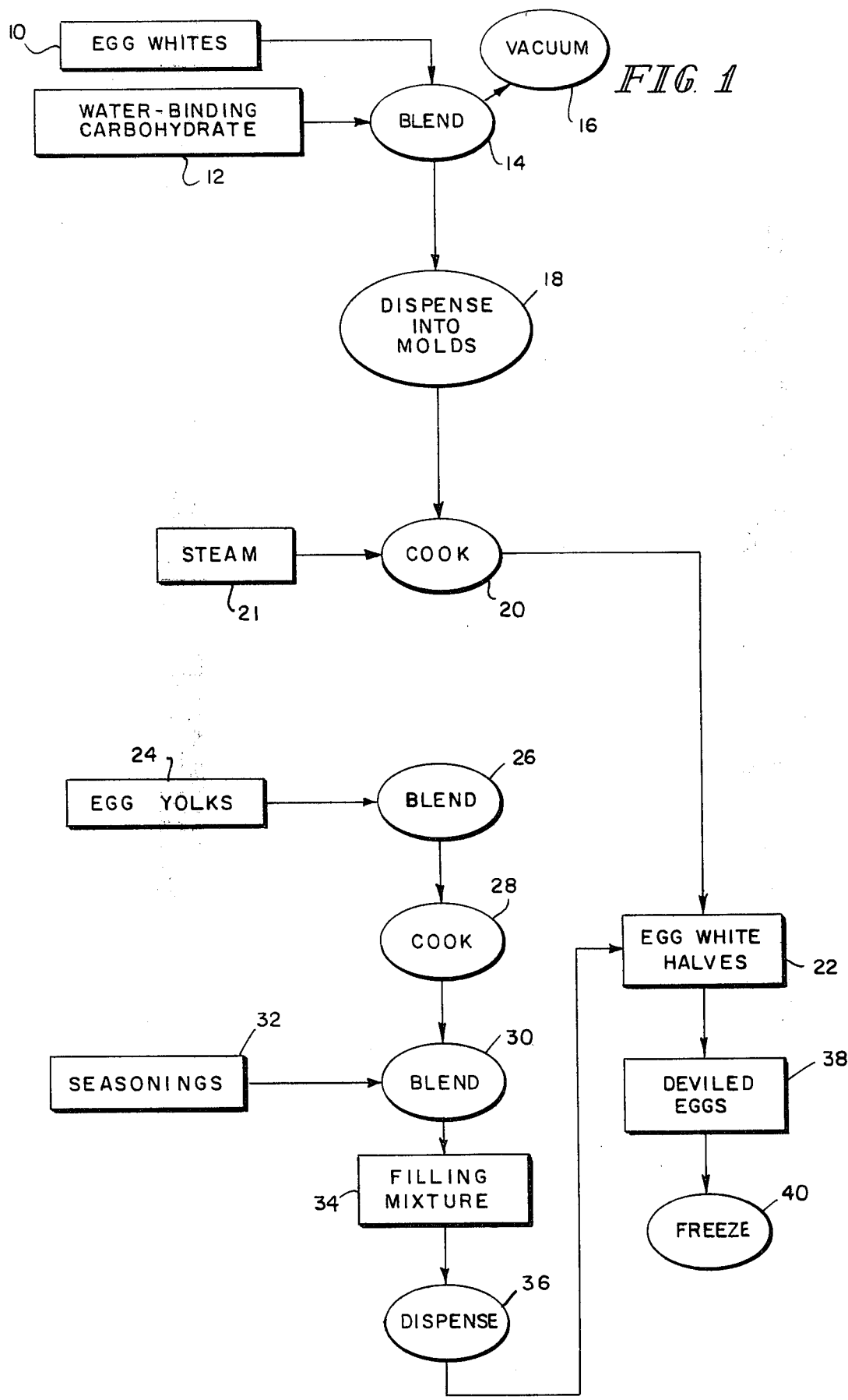
FIG. 1 is a process flow sheet illustrating a detailed form of the invention which begins with separated egg whites and egg yolks and ends with frozen deviled eggs.

The process of FIG. 1 begins with separated egg whites 10 and egg yolks 24, obtained in a known manner from eggs of breaker quality.

Egg whites 10 and a water-binding carbohydrate 12 such as modified tapioca starch are thoroughly blended 14 in a vessel to which vaccum 16 is applied to remove dissolved and entrained air and other gases. The blended and de-gassed mixture is dispensed 18 into molds, for example as illustrated in FIG. 2, and cooked 20 in steam 21 until completely solidified. The resulting egg white halves 22, having centrally located cavities of the size and shape of half a yolk, are removed from the molds.

In a separate operation, egg yolks 24 are thoroughly blended 26, cooked 28 until solid and dry, and blended 30 with seasonings 32 such as salt, pepper, mustard, paprika, and mayonnaise or salad dressing to yield deviled egg filling mixture 34. The latter is dispensed 36 (see FIG. 3) into egg-white halves 22, yielding the desired deviled egg product 38 (see FIG. 4). The product can be frozen 40 if desired, and when wrapped and stored in water-impervious plastic, retains its quality for a long time. It is restored essentially to its original form upon thawing.

FIG. 2 is a drawing in cross section of a mold and cooking assembly for use in the present invention. Into a cavity 210 in conveyor belt 212 is placed mold 214, suitably made of thin-gauge stainless steel. The mold, having the size and shape of half an egg, is retained by lip 216 upon edge 218 of cavity 210. Centrally positioned within mold 214 is a hemispherical insert 220, which forms the lower end of cylindrical retainer 222. Means (indicated symbolically at 224) are provided for introducing and retracting insert 220. With insert 220 in place, liquid egg white 226 is dispensed into mold 214 to substantially fill the mold, which is then moved upon conveyor belt 212 through a steam bath (surrounding the entire assembly) at such a rate as to allow the egg white to become completely solidified before emerging from the bath. When cooking is complete, insert 220 is retracted and the cooked egg white (22 in FIG. 1) is removed from the mold.

The cooked egg white halves are then conveyed to filler station 310 (FIG. 3), where deviled egg filling mixture 312 (34 in FIG. 1) is dispensed into them (36 in FIG. 1), yielding the final deviled egg product 314 (38 in FIG. 1) shown in FIG. 4.

The product, FIG. 4, is a typical deviled egg, having the seasoned yolk composition 410 filled into the cavity of the cooked egg white half 412, differing only in that the yolk composition is always centrally placed in the product of the present invention.

While the invention has been described with reference to certain specific embodiments thereof, it is to be understood that numerous modifications may be made without departing from the spirit of the invention. Such modifications are therefore to be understood as lying within the scope of the invention.

What is claimed is:

1. A method for the production of deviled eggs, which comprises labor-sparing and materials-sparing steps of pooling, blending, and de-aerating liquid egg whites, separately pooling and blending liquid egg yolks, providing a multiplicity of open molds carried on a conveyor means and dispensing the de-aerated egg whites into said multiplicity of open molds carried on conveyor means, the said molds having the shape and size of half an egg, introducing medially into each of said open molds a removable insert spaced from the sides of the open mold so as to maintain the mold in an open condition, the removable insert forming a hemispherical cavity the size of half a yolk in the egg white pool in each mold, conveying said filled open molds containing said inserts into a cooking zone and maintaining them in said zone for sufficient time to cook the egg whites, conveying them out of the cooking zone, removing the inserts, separately cooking and seasoning the egg yolks, and filling the cooked egg white halves with said seasoned egg yolk to produce deviled eggs.

2. The method of claim 1 wherein said liquid egg whites, before being dispensed into said molds, are blended with up to about 10% by weight of a water-binding substance selected from the group consisting of starches, edible gums, and food-grade cellulose derivatives.

3. The method of claim 2 wherein said water-binding substance is a starch, used in a proportion between about 2% and about 4% by weight based on the weight of the liquid egg whites.

4. The method of claim 3 wherein said starch is a modified tapioca starch.

5. The method of claim 3 wherein said starch is corn starch.

6. The method of claim 2 wherein said water-binding substance is a food-grade cellulose derivative, used in a proportion between about 0.25% and about 1% by weight based on the weight of the liquid egg whites.

7. The method of claim 2 wherein said water-binding substance is an edible gum, used in a proportion between about 0.25% and about 1% by weight based on the weight of the liquid egg whites.

* * * * *

UNITED STATES PATENT AND TRADEMARK OFFICE
CERTIFICATE OF CORRECTION

PATENT NO. : 4,426,400

DATED : January 17, 1984

INVENTOR(S) : James L. Newlin and William J. Stadelman

It is certified that error appears in the above-identified patent and that said Letters Patent is hereby corrected as shown below:

Column 2, line 49 should read -- of 50 to 100 mm Hg in the treating vessel is sufficient, with --.

Signed and Sealed this

First Day of May 1984

[SEAL]

Attest:

GERALD J. MOSSINGHOFF

Attesting Officer       Commissioner of Patents and Trademarks